(12) United States Patent
Gonia et al.

(10) Patent No.: US 10,001,545 B2
(45) Date of Patent: Jun. 19, 2018

(54) SYSTEM AND METHOD FOR IMPROVED LOCATION ACCURACY

(71) Applicant: Honeywell International Inc., Morris Plains, NJ (US)

(72) Inventors: Patrick S. Gonia, Maplewood, MN (US); Soumitri Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 15/423,321

(22) Filed: Feb. 2, 2017

(65) Prior Publication Data

US 2017/0212209 A1    Jul. 27, 2017

Related U.S. Application Data

(63) Continuation of application No. PCT/US2015/048012, filed on Sep. 2, 2015, which is
(Continued)

(51) Int. Cl.
*G01S 5/02*     (2010.01)
*G01S 1/70*     (2006.01)
(Continued)

(52) U.S. Cl.
CPC .............. *G01S 5/0289* (2013.01); *G01S 1/14* (2013.01); *G01S 1/70* (2013.01); *G01S 5/0247* (2013.01); *G01S 5/16* (2013.01)

(58) Field of Classification Search
CPC ..................................................... G01S 5/0289
(Continued)

(56) References Cited

U.S. PATENT DOCUMENTS 7,188,000 B2    3/2007    Chiappella et al.
7,345,582 B2 *  3/2008    Gould ..................... G01S 5/166
                                                     340/539.26
(Continued)

OTHER PUBLICATIONS

U.S. Appl. No. 14/481,045, Office Action, dated Jun. 29, 2015, 11 pages.
(Continued)

*Primary Examiner* — Santiago Garcia
(74) *Attorney, Agent, or Firm* — Wick Phillips Gould & Martin LLP (57) ABSTRACT

Systems and methods for improved location accuracy are provided. For example, some systems can include a location engine, and a plurality of location anchors. In some embodiments, each of the plurality of location anchors can transmit or receive signals to or from an object for determining an angular orientation of the object with respect to the plurality of location anchors, and based on the angular orientation, the location engine can estimate a location of the object. In some embodiments, each of the plurality of location anchors can transmit first signals to the location engine, the location engine can receive a second signal from an object, based on the first signals and the second signal, the location engine can determine a differential pressure between the plurality of location anchors and the object, and based on the differential pressure, the location engine can estimate an altitude of the object.

20 Claims, 4 Drawing Sheets

Related U.S. Application Data a continuation of application No. 14/481,045, filed on Sep. 9, 2014, now Pat. No. 9,535,153.

(51) Int. Cl.
*G01S 1/14* (2006.01)
*G01S 5/16* (2006.01)

(58) Field of Classification Search
USPC .......................................................... 342/451
See application file for complete search history.

(56) References Cited

U.S. PATENT DOCUMENTS

| | | | |
|---|---|---|---|
| 7,603,129 B2 | 10/2009 | Gonia et al. | |
| 7,609,159 B2* | 10/2009 | Benson | G05B 13/0275 340/539.13 |
| 8,442,801 B2* | 5/2013 | Gonla | G01S 5/0289 702/150 |
| 9,535,153 B2 | 1/2017 | Gonia et al. | |
| 9,741,225 B1* | 8/2017 | Kanan | G08B 21/0266 |
| 2007/0030832 A1* | 2/2007 | Gonia | H04L 12/28 370/338 |
| 2008/0168826 A1* | 7/2008 | Saidi | G01M 3/20 73/40 |
| 2009/0212995 A1* | 8/2009 | Wu | G01S 5/0278 342/109 |
| 2009/0253388 A1* | 10/2009 | Kielb | G01D 21/00 455/117 |
| 2010/0085579 A1 | 4/2010 | Carlen | |
| 2010/0305752 A1 | 12/2010 | Abramson | |
| 2011/0151810 A1 | 6/2011 | Su et al. | |
| 2011/0161885 A1* | 6/2011 | Gonia | G08B 17/10 715/847 |
| 2011/0256800 A1 | 10/2011 | Jennings et al. | |
| 2011/0298615 A1* | 12/2011 | Rich | A01K 15/023 340/539.13 |
| 2012/0129535 A1* | 5/2012 | Oh | H04B 7/0617 455/438 |
| 2013/0155102 A1 | 6/2013 | Gonia et al. | |
| 2014/0051459 A1 | 2/2014 | Gonia | |
| 2014/0073363 A1* | 3/2014 | Tidd | G01S 5/0242 455/456.5 |
| 2014/0074743 A1* | 3/2014 | Rademaker | G06Q 50/28 705/334 |
| 2014/0194142 A1* | 7/2014 | Hedley | G01S 5/14 455/456.1 |
| 2014/0200023 A1* | 7/2014 | Price | G01S 5/14 455/456.1 |
| 2014/0213283 A1* | 7/2014 | Gillett | G01S 5/0072 455/456.1 |
| 2014/0248899 A1* | 9/2014 | Emadzadeh | G01S 5/0236 455/456.1 |
| 2014/0295877 A1* | 10/2014 | Hart | H04W 4/02 455/456.1 |
| 2015/0133173 A1* | 5/2015 | Edge | G01S 1/66 455/456.6 |

OTHER PUBLICATIONS

U.S. Appl. No. 14/481,045, Final Office Action, dated Nov. 23, 2015, 9 pages.
U.S. Appl. No. 14/481,045, Advisory Action, dated Feb. 2, 2016, 3 pages.
U.S. Appl. No. 14/481,045, Pre-Appeal Brief Conference Decision, mailed Feb. 25, 2016, 2 pages.
U.S. Appl. No. 13/887,069, Notice of Allowance, dated Aug. 17, 2016, 11 pages.
Partial Search Report, PCT/US2015/048012, dated Dec. 14, 2015, 8 pages.
PCT Application No. PCT/U52015/048012, International Search Report, dated Feb. 19, 2016, 7 pages.
PCT Application No. PCT/US2015/048012, Written Opinion of the International Searching Authority, dated Feb. 19, 2016, 12 pages.
PCT Application No. PCT/US2015/048012,International Preliminary Report on Patentability, dated Mar. 23, 2017, 13 pages.
PCT Application No. PCT/US20151048012, Partial Search Report, dated Dec. 14, 2015,8 pages.

\* cited by examiner

SYSTEM AND METHOD FOR IMPROVED LOCATION ACCURACY

CROSS REFERENCE TO RELATED APPLICATIONS

This application is a continuation of International Application No. PCT/US2015/048012 (entitled SYSTEM AND METHOD FOR IMPROVED LOCATION ACCURACY filed Sep. 2, 2015) which claims priority to and is a continuation of U.S. patent application Ser. No. 14/481,045 (entitled SYSTEM AND METHOD FOR IMPROVED LOCATION ACCURACY filed Sep. 9, 2014), both of which are incorporated herein by reference in their entirety.

FIELD

The present invention relates generally to location anchors. More particularly, the present invention relates to a system and method for improved location accuracy.

BACKGROUND

Location systems are known for providing location estimations for tracking the location of an object, for example, a mobile device, within a region, for example, a building, plant, or other facility. For example, many known location systems include location anchors (LA).

In many known location systems, an object can transmit a probe request to a location anchor and receive a probe response from the location anchor. The object can then measure the received signal strength indication (RSSI) of the probe response to estimate the distance to the location anchor.

The following documents disclose exemplary location systems that include exemplary location anchors: U.S. Pat. No. 7,603,129 titled "Localization Identification System for Wireless Devices"; U.S. Pat. No. 8,442,801 titled "Wireless Location-Based System for Detecting Hazardous Conditions"; U.S. Publication No. 2013/0155102 titled "Systems and Methods of Accuracy Mapping in a Location Tracking System"; U.S. Publication No. 2011/0161885 titled "Wireless Location-Based System and Method for Detecting Hazardous and Non-Hazardous Conditions"; and U.S. Publication No. 2014/0051459 titled "System and Method for Improved Location System Accuracy". Each of the above-identified documents is assigned to the assignee hereof and is hereby incorporated by reference.

Notwithstanding the above, known location systems can provide location estimations with only limited accuracy. To increase location accuracy, known location systems have added infrastructure in the form of more location anchors. However, such systems have limits, both in terms of accuracy and infrastructure.

In view of the above, there is a continuing, ongoing need for a system and method for improved location accuracy, especially in regions where additional accuracy is desirable.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods for improved location accuracy. For example, some systems and methods disclosed herein can include enhanced location anchors that can be IEEE 802.11-2007 compliant, that can provide additional information as compared to known location anchors, that can be used to increase location estimation accuracy as compared to known systems and methods, and that can be used to provide 3D location estimation. It is to be understood that a location anchor as disclosed herein can include any device that responds to a probe request signal with a probe response signal and/or that periodically transmits a beacon signal from a known location with a known transmission power and with an identifier that identifies the particular device/location anchor.

In accordance with disclosed embodiments, an object, for example, a mobile device, within a region, for example, a building, plant, or other facility, can transmit a probe request to a location anchor and receive a probe response from the location anchor that can include the additional information as disclosed herein. Then, the object and/or a location engine (LE) can use the additional information to improve and increase the accuracy of the location estimation of the object.

In some embodiments, the location engine and/or the object communicating with the location anchor can measure a round trip time-of-flight for the probe request and the probe response and use such a measurement to estimate distance information and/or the location of the object. In these embodiments, the location anchor can support a fixed known response latency.

In some embodiments, the location engine and/or the object communicating with the location anchor can estimate the angular position and/or orientation of the object with respect to the orientation of the location anchor. In these embodiments, the location anchor can include a plurality of directional electromagnetic radiation sources and/or transmitters, for example, antennas, signaling light emitting diodes (LEDs), or laser diodes, directed in a plurality of directions, and each transmission emitted by a directional transmitter can include a unique signal. Additionally or alternatively, in these embodiments, the location anchor can incorporate one or more receivers of electromagnetic radiation, for example, a plurality of directional receivers, such as light detectors, or a plurality of directional antennas and/or a plurality of omni-directional antennas that can be used in phased array beam forming.

In embodiments in which the location anchor includes directional transmitters, for example, LEDs, the object can include a photo detector that can receive the optical signals from the LEDs and, in some embodiments, based on the received signals, the object can determine an address or identifier of the location anchor and/or the angle of the location anchor relative to the position of the object. For example, in some embodiments, the object can determine the strongest signal received from location anchor. Then, the location engine and/or the object can estimate the angular orientation of the object with respect to the location anchor. In some embodiments, at least some of the location anchor's LEDs can be visible and/or infrared.

In embodiments in which the location anchor includes directional transmitters and/or directional receivers, beam forming or directional antennas can detect the angular position of the object with respect to the orientation of the location anchor by detecting the best beam pattern for transmitting a signal to the object and/or for receiving the probe request from the object. For example, in some embodiments, the location anchor can determine the beam pattern at which the strongest signal is received from the object. The angle corresponding to the best beam pattern and/or angular position can be transmitted to the location engine and/or the object, which can use such information to estimate the location of the object.

In some embodiments, the location anchor and/or the object communicating with the location anchor can incorporate a pressure sensor, for example, a barometric or atmospheric pressure sensor, to determine the vertical position and/or altitude of the object. For example, the location anchor can be placed at a fixed location in the monitored region at a fixed and known altitude. The location engine can receive a signal from the pressure sensor in one or more location anchors and from the pressure sensor in the object and determine a differential pressure between the one or more location anchors and the object. Then, based on the differential pressure, the location engine and/or the object can estimate the actual altitude, in the z direction, of the object with respect to the known altitude of the location anchor.

In some embodiments, the location engine can determine the location anchor(s) nearest, in the x and y directions, that is, in the horizontal plane, to the object and use the signals from the pressure sensors in the nearest location anchors for determining the differential pressure. Furthermore, in some embodiments, the location engine can weight the signals from the pressure sensors in the location anchors so that signals from the location anchors nearest, in the x and y directions, to the object have more weight in determining the differential pressure.

In some embodiments, the location engine can store time dependent pressure readings from the pressure sensors in the location anchors and use the stored readings to determine the differential pressure at any given time.

Figure 1:
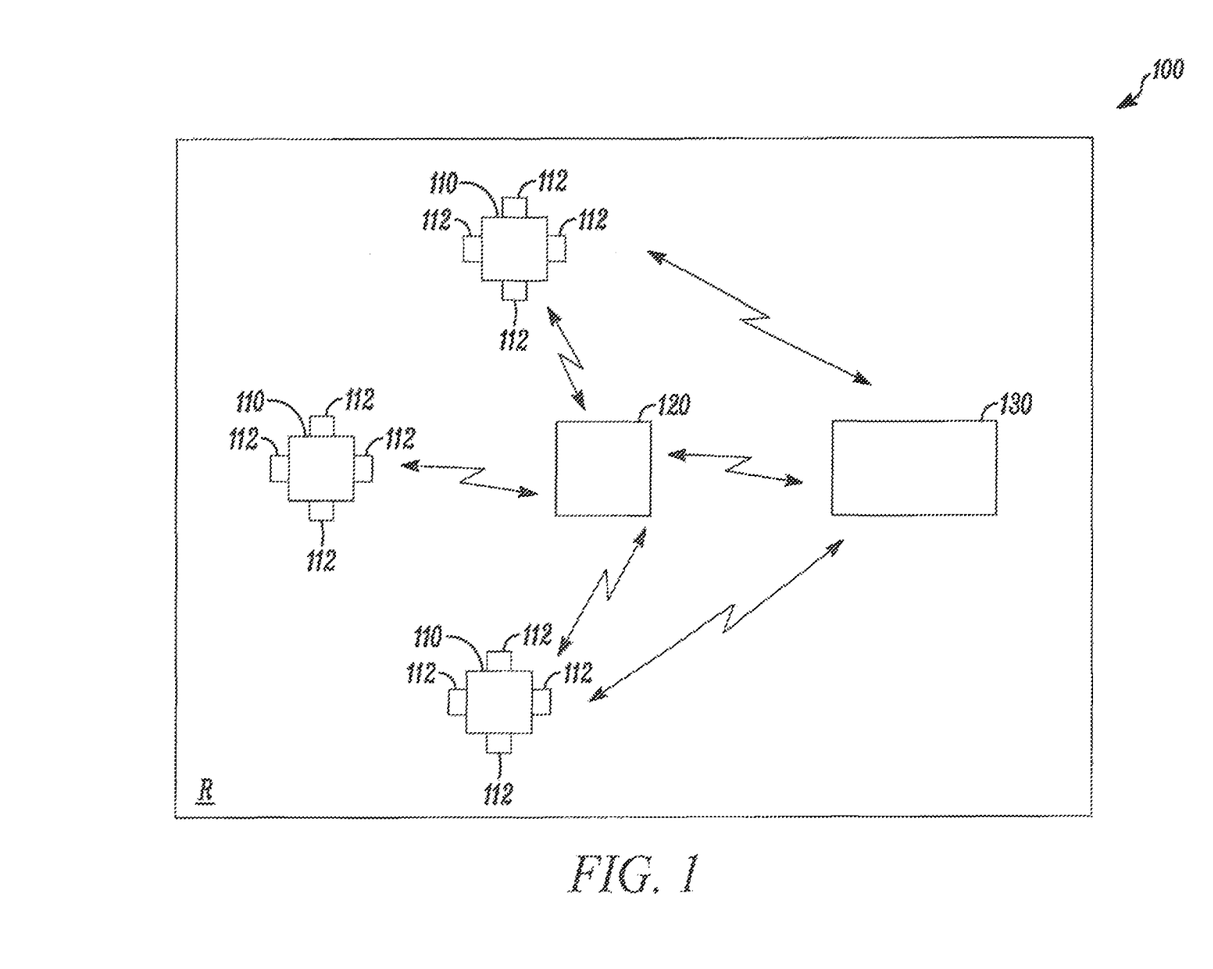
FIG. 1 is a block diagram of a system in accordance with disclosed embodiments in which location anchors include an array of directional electromagnetic radiation sources and/or transmitters.
Figure 2:
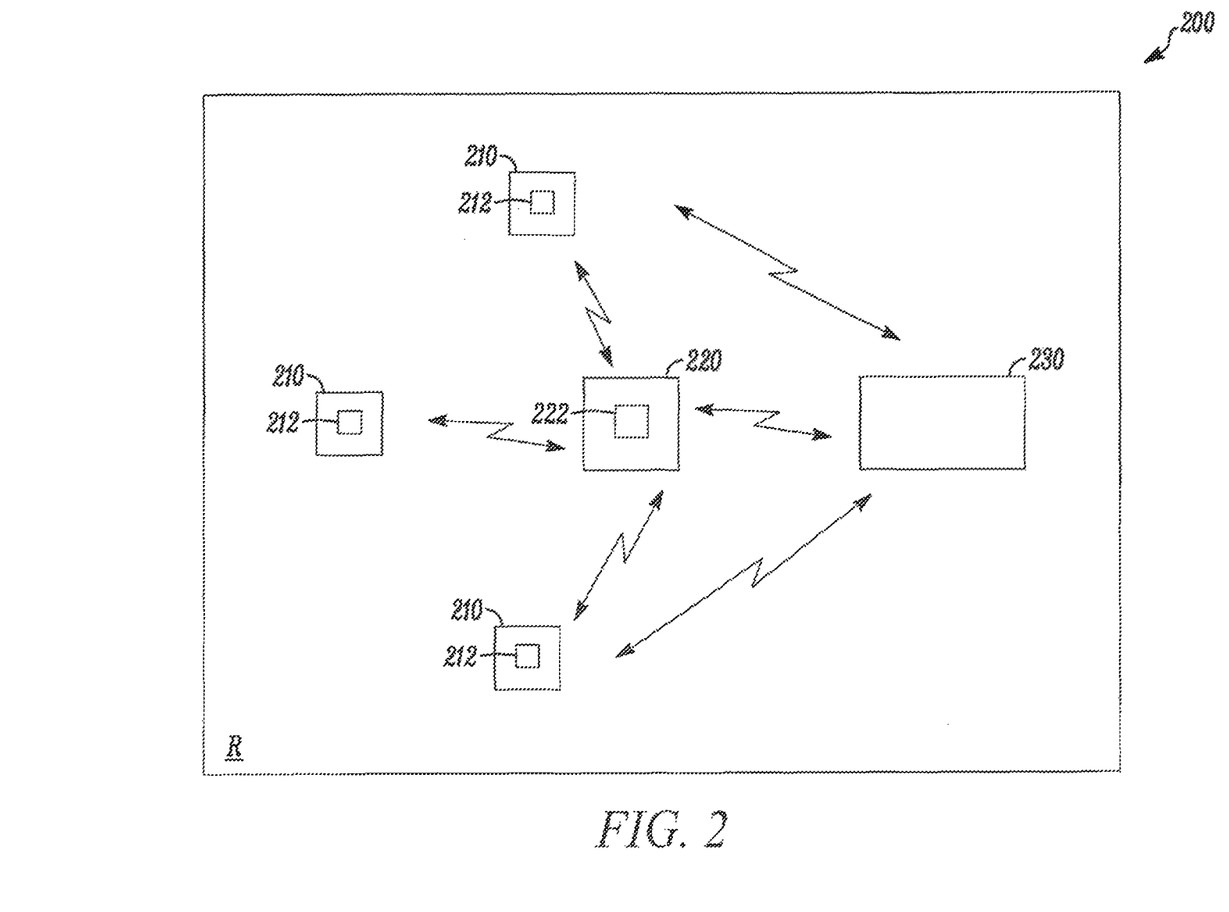
FIG. 2 is a block diagram of a system in accordance with disclosed embodiments in which location anchors include a pressure sensor.
Figure 3:
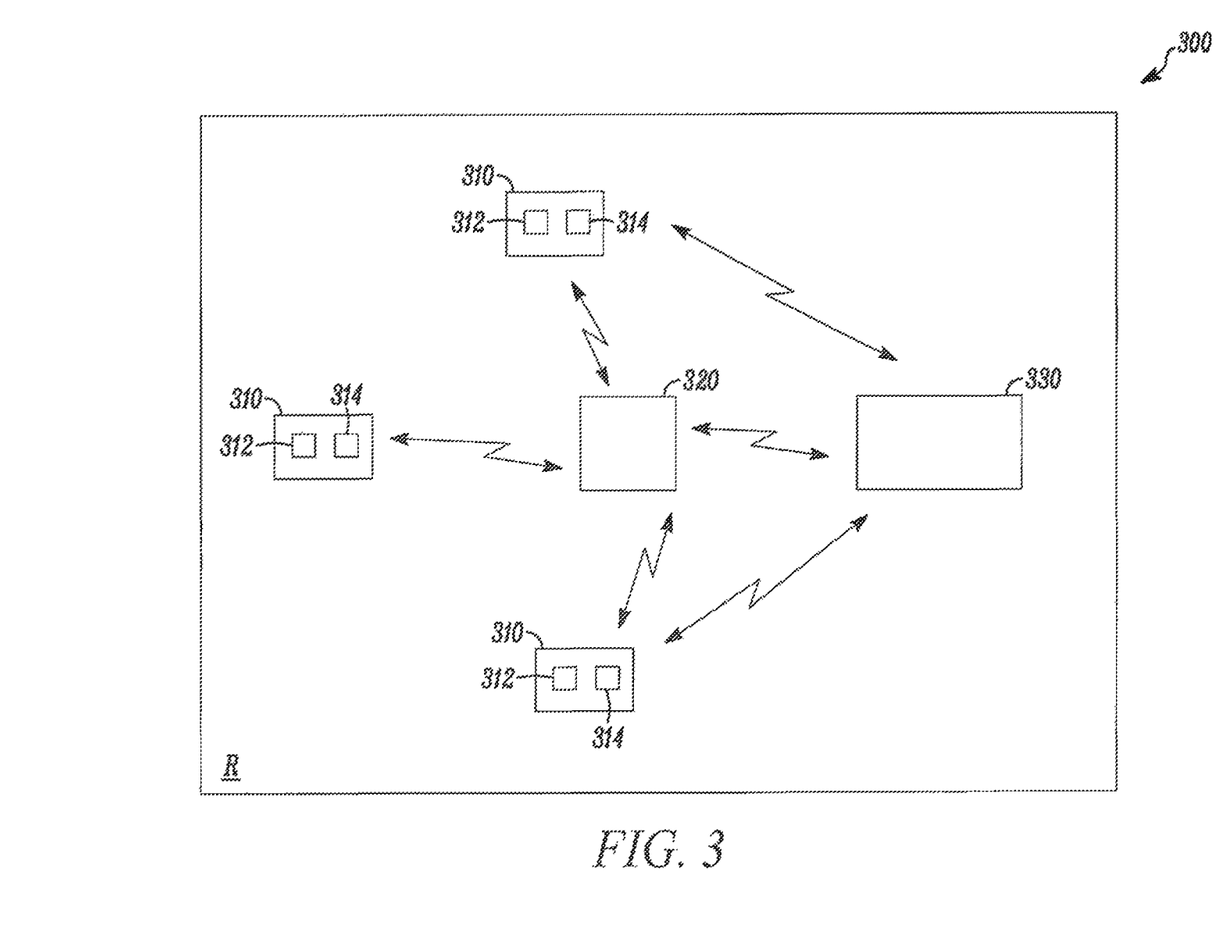
FIG. 3 is a block diagram of a system in accordance with disclosed embodiments in which location anchors include a phased array or directional antennas.

FIGS. 1-3 are block diagrams of systems 100, 200, 300 in accordance with disclosed embodiments that include location anchors 110, 210, 310. For example, the location anchors 110 in the system 100 in FIG. 1 can include an array of directional electromagnetic radiation sources and/or transmitters (for example, LEDs) 112, the location anchors 210 in the system 200 in FIG. 2 can include a pressure sensor 212, and the location anchors 310 in the system 300 in FIG. 3 can include a phased array 312 or directional antennas 314. It is to be understood that embodiments disclosed herein can include each of the systems 100, 200, 300 individually and/or in combination.

As seen in FIG. 1, the system 100 can include a plurality of location anchors 110 with fixed and known locations in a monitored region R. The system 100 can also include an object 120 in the monitored region R that can communicate with at least some of the location anchors 110 and with a location engine 130. Although the location engine 130 is shown within the region R in FIG. 1, it is to be understood that in some embodiments, the location engine 130 can be located outside of the region R and in some embodiments, the location engine 130 can be located within the object 120.

Each location anchor 110 can include an array of directional electromagnetic radiation sources and/or transmitters, for example, LEDs 112, surrounding the perimeter of the location anchor 110 so that the location anchor 110 can transmit signals at a plurality of identifiable angles. That is, each of the LEDs 112 can transmit a signal, for example, a beam of light, in a respective direction. In some exemplary embodiments, the location anchor 110 can include eight LEDs, and each LED can have an approximate 45 degree beamwidth. In other exemplary embodiments, the beams from each LED can have a solid angle width in three dimensions. However, embodiments disclosed herein are not so limited.

In some embodiments, the LEDs 112 can emit a signal responsive to the respective location anchor 110 receiving a probe request from the object 120. However, in some embodiments, the LEDs 112 can emit a signal periodically or continuously irrespective of receiving a probe request from the object 120.

In some embodiments, the signal emitted by each LED 112 can include an identifier, for example, the common MAC address of the respective location anchor 110. Additionally or alternatively, in some embodiments, the signal emitted by each LED 112 can include a sub-identifier or sub-address to indicate the angular position or direction of the LED 112 on the location anchor 110.

The object 120 can receive at least some of the signals emitted by the LEDs 112 of the location anchors 110 in the region R. For example, in some embodiments, the object 120 can include an optical photo detector that can read data included in the signals from the LEDs 112. In some embodiments, the object 120 can transmit a compute location message (CLM) to the location engine 130 and can include the data read from the signals from the LEDs 112 in the CLM. The location engine 130 can then use the data in the CLM to estimate the angular orientation of the object 120 with respect to the orientation of the location anchor 110. For example, the object 120 and/or the location engine 130 can determine the strongest signal received from the LEDs 112 of the location anchors 110. In some embodiments, the location engine 130 can then use the determined angular orientation as well as information from RSSI signals to determine the location of the object 120 in two-dimensional or three-dimensional space.

In some embodiments, the LEDs 112 of each location anchor 110 can be time sequenced and transmit a respective signal in a respective time interval to avoid simultaneous transmission. Furthermore, in some embodiments, the LEDs 112 of nearby location anchors 110 can be time sequenced and transmit a respective signal in a respective time interval to avoid simultaneous transmission.

As seen in FIG. 2, the system 200 can include a plurality of location anchors 210 with fixed and known locations and with fixed and known altitudes in a monitored region R. The system 200 can also include an object 220 in the monitored region R that can communicate with at least some of the location anchors 210 and with a location engine 230. Although the location engine 230 is shown within the region R in FIG. 2, it is to be understood that in some embodiments, the location engine 230 can be located outside of the region R and in some embodiments, the location engine 230 can be located within the object 220.

Each location anchor 210 can include a pressure sensor 212, and each pressure sensor 212 can be continuously or periodically monitored as needed. For example, in some embodiments, a location anchor 210 can transmit the pressure measured by the pressure sensor 212 responsive to the respective location anchor 210 receiving a probe request from the object 220. However, in some embodiments, the location anchor 210 can transmit the pressure measured by the pressure sensor 212 periodically or continuously irrespective of receiving a probe request from the object 220.

The signal transmitted by the location anchor 210 can include data regarding a pressure reading of the sensor 212. In some embodiments, the object 220 can receive at least some of the signals transmitted by the location anchors 210 in the region R and can include the data from the pressure sensors 212 in a CLM transmitted to the location engine 130. However, in some embodiments, the location engine 130 can directly receive at least some of the pressure measurement signals transmitted by the location anchors 210 in the region R.

The object 220 can also include a pressure sensor 222, and the object 220 can include data regarding a pressure reading of the sensor 222 in the CLM transmitted to the location engine 230. The location engine 230 can then use the data in the CLM and/or the pressure measurement data received directly from the location anchors 210 to determine a differential pressure between the sensors 212, 222 and, based on the differential pressure, to estimate the altitude of the object 220. In some embodiments, the location engine 230 can then use the determined differential pressure and/or the estimated altitude as well as information from RSSI signals to determine the location of the object 220 in three-dimensional space.

As seen in FIG. 3, the system 300 can include a plurality of location anchors 310 with fixed and known locations in a monitored region R. The system 300 can also include an object 320 in the monitored region R that can communicate with at least some of the location anchors 310 and with a location engine 330. Although the location engine 330 is shown within the region R in FIG. 3, it is to be understood that in some embodiments, the location engine 330 can be located outside of the region R and in some embodiments, the location engine 330 can be located within the object 320.

Each location anchor 310 can include one or more transmitters and/or receivers of electromagnetic radiation. For example, in some embodiments, each location anchor 310 can include a phased array 312 that includes multiple antennas. Additionally or alternatively, in some embodiments, each location anchor 310 can include a directional antenna 314. The phased array 312 and/or the directional antenna 314 can transmit and/or receive signals sequentially at a plurality of identifiable angles.

For example, in some embodiments, at least some of the phased arrays 312 and/or the directional antennas 314 in the region R can receive a probe request from the object 320 and responsive thereto, the respective location anchor 310 can determine the phase pattern that best receives the probe request and/or that receives the strongest signal from the object 320 and thereby estimate the angular position or direction of the object 320 relative to the location anchor 310. Then, the location anchor 310 can transmit a message to the object 320 and/or to the location engine 330 with the estimated angular position or direction. In some embodiments, the location engine 330 can then use the determined angular orientation as well as information from RSSI signals to determine the location of the object 320 in two-dimensional or three-dimensional space.

Figure 4:
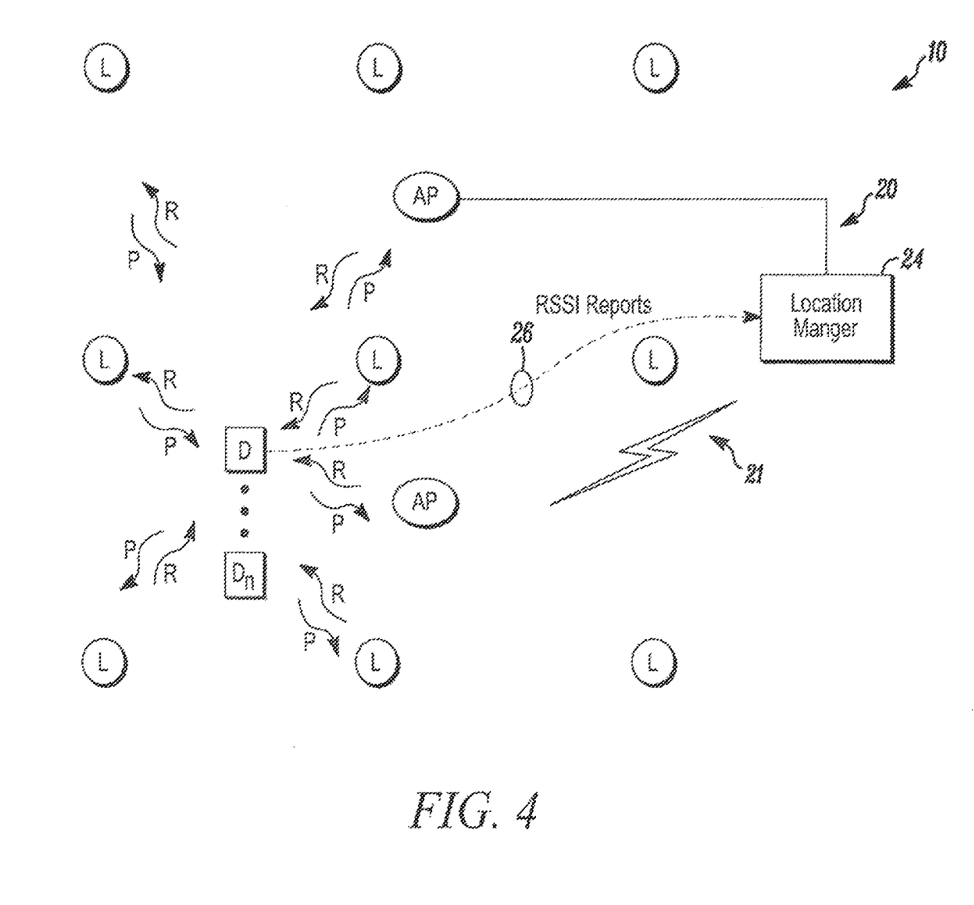
FIG. 4 is a schematic diagram of a system in accordance with disclosed embodiments.

FIG. 4 further illustrates some of the embodiments disclosed herein. As seen in FIG. 4, a wireless regional monitoring system 10 can be installed in a region R1. Access points AP can provide wireless local area network service through the region R1 via backhaul wires 20 and/or via a wireless backhaul link 21 to a location engine, for example, location manager 24. Furthermore, members of a plurality of relatively low cost location anchors L can be distributed throughout the region R1.

In some embodiments, the location anchors L can provide responses R to wireless probes P received from objects D . . . Dn such as mobile devices or units, for example, gas detectors moving throughout the region R1 by transmitting the additional information as disclosed herein. For example, the location anchors L can transmit information related to the angular orientation of the objects D . . . Dn with respect to the location anchors L and/or information related to readings from pressure sensors in the location anchors L. In some embodiments, the location anchors L can transmit such information to the objects D . . . Dn, to the access points AP, and/or directly to the location manager 24, and in some embodiments, the location anchors L, the objects D . . . Dn, and/or the location manager 24 can use such information to determine an angular orientation of the objects D . . . Dn with respect to the location anchors L and accordingly, to estimate a location of the objects D . . . Dn and/or to determine a differential pressure between the objects D . . . Dn and the location anchors L and accordingly, to estimate an altitude of the objects D . . . Dn. That is, in some embodiments, at least the location manager 24 can use the determined angular orientation, the determined differential pressure and/or the estimated altitude as well as information from RSSI signals to determine the location of the objects D . . . Dn in two-dimensional or three-dimensional space.

As those of skill in the art will understand, each of the location anchors 110, 210, 310, and L, the objects 120, 220, 320, and D . . . Dn, and the location engines 130, 230, 330 can include a transceiver for supporting wireless communication therebetween and control circuitry, one or more programmable processors, and executable control software as would be understood by those of skill in the art. For example, in some embodiments, the transceiver can be and/or include one or both of the directional transmitters and directional receivers of the location anchors 110, 210, 310, and L.

The executable control software can be stored on a transitory or non-transitory computer readable medium, including, but not limited to, local computer memory, RAM, optical storage media, magnetic storage media, flash memory, and the like. In some embodiments, the control circuitry, the programmable processors, and/or the executable control software can execute and control the transmission of messages, data, and information between the objects and D . . . Dn, and the location engines 130, 230, 330 and the estimation of angular orientation, angular position or direction, and/or altitude of the objects 120, 220, 320, and D . . . Dn as disclosed herein.

While the systems and methods have been described herein, specific embodiments can include, but are not limited to:

In a first embodiment, a location anchor comprises a transceiver; a programmable processor; executable control software stored on a non-transitory computer readable medium; and one or more directional transmitters or directional receivers of electromagnetic radiation, wherein, based on the directional transmitters transmitting first signals to an object at a plurality of identifiable angles or based on the directional receivers receiving second signals from the object at a plurality of identifiable angles, an angular orientation of the object with respect to the location anchor is determined.

A second embodiment can include the location anchor of the first embodiment, wherein the transceiver includes the directional transmitters or the directional receivers.

A third embodiment can include the location anchor of the first embodiment, wherein the transceiver transmits, to a location engine, information related to the angular orientation of the object with respect to the location anchor, and wherein, based on the information, the location engine determines the angular orientation of the object with respect to the location anchor.

A fourth embodiment can include the location anchor of the third embodiment, wherein the location engine uses the determined angular orientation of the object with respect to the location anchor to determine a location of the object.

A fifth embodiment can include the location anchor of the first embodiment, wherein the first signals transmitted from the directional transmitters to the object include information unique to a respective identifiable angle.

A sixth embodiment can include the location anchor of the fifth embodiment, wherein the information includes an identifier of the location anchor and a sub-identifier indicative of an angular direction of the respective identifiable angle.

A seventh embodiment can include the location anchor of the first embodiment, wherein the directional transmitters transmit the first signals responsive to the transceiver receiving a probe request.

An eighth embodiment can include the location anchor of the first embodiment, wherein the directional transmitters transmit the first signals continuously or at periodic intervals.

A ninth embodiment can include the location anchor of the eighth embodiment, wherein the directional transmitters transmitting the first signals at each of the plurality of identifiable angles are time sequenced.

A tenth embodiment can include the location anchor of the first embodiment, wherein the transceiver transmits a third signal that includes the angular orientation of the object with respect to the location anchor.

In an eleventh embodiment, a location anchor comprises: a transceiver; a programmable processor; executable control software stored on a non-transitory computer readable medium; and a pressure sensor, wherein, based on the transceiver transmitting a signal that includes information related to a reading from the pressure sensor, a differential pressure between the pressure sensor and a second pressure sensor in an object is determined.

A twelfth embodiment can include the location anchor of the eleventh embodiment, wherein the transceiver transmits the signal continuously or at periodic intervals.

A thirteenth embodiment can include the location anchor of the eleventh embodiment, wherein the transceiver transmits the signal to a location engine, wherein the location engine determines the differential pressure, and wherein, based on the differential pressure, the location engine estimates an altitude of the object.

In a fourteenth embodiment, a system comprises: a location engine; and a plurality of location anchors, wherein at least some of the plurality of location anchors transmit or receive signals to or from an object for determining an angular orientation of the object with respect to the at least some of the plurality of location anchors, and wherein, based on the angular orientation of the object with respect to the at least some of the plurality of location anchors, the location engine estimates a location of the object.

A fifteenth embodiment can include the system of the fourteenth embodiment, wherein at least one of the plurality of location anchors includes one or more directional transmitters.

A sixteenth embodiment can include the system of the fifteenth embodiment, wherein the one or more directional transmitters include an LED or a laser diode.

A seventeenth embodiment can include the system of the fourteenth embodiment, wherein the object transmits, to the location engine, information related to the angular orientation of the object with respect to the at least some of the plurality of location anchors, and wherein, based on the information, the location engine determines the estimated location of the object.

In an eighteenth embodiment, a system comprises: a location engine; and a plurality of location anchors, wherein at least some of the plurality of location anchors transmit first signals to the location engine, wherein the location engine receives a second signal from an object, wherein, based on the first signals and the second signal, the location engine determines a differential pressure between the at least some of the plurality of location anchors and the object, and wherein, based on the differential pressure, the location engine estimates an altitude of the object.

A nineteenth embodiment can include the system of the eighteenth embodiment, wherein the location engine uses the estimated altitude of the object to determine a location of the object in three dimensions.

A twentieth embodiment can include the system of the eighteenth embodiment, wherein the location engine weights the first signals received from the at least some of the plurality of location anchors according to an estimated distance of a respective location anchor from the object.

A twenty first embodiment can include the system of the eighteenth embodiment, wherein the first signals include a pressure measured by a pressure sensor in a respective location anchor, and wherein the second signal includes a pressure measured by a pressure sensor in the object.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A system comprising:
a location anchor, wherein the location anchor comprises:
a transceiver;
a programmable processor;
executable control software stored on a non-transitory computer readable medium; and
a plurality of directional transmitters of electromagnetic radiation,
wherein the plurality of directional transmitters are positioned about a perimeter of the location anchor, wherein the directional transmitters are configured to transmit first signals to an object at a plurality of identifiable angles, and wherein, based on the first signals, a location engine is configured to determine an angular orientation of the object with respect to the location anchor;

wherein each directional transmitter of the plurality of directional transmitters is configured to include information unique to a respective identifiable angle in a corresponding first signal of the first signals transmitted from the plurality of directional transmitters to the object.

2. The location anchor of claim 1, further comprising: the location engine in signal communication with the location anchor.

3. The location anchor of claim 2, wherein the transceiver is configured to transmit, to the location engine, information related to the angular orientation of the object with respect to the location anchor, and wherein, based on the information, the location engine is configured to determine the angular orientation of the object with respect to the location anchor.

4. The location anchor of claim 3, wherein the location engine is configured to use the determined angular orientation of the object with respect to the location anchor to determine a location of the object.

5. The location anchor of claim 1, wherein the information includes an identifier of the location anchor and a sub-identifier indicative of an angular direction of the respective identifiable angle.

6. The location anchor of claim 1, wherein the plurality of directional transmitters is configured to transmit the first signals continuously or at periodic intervals.

7. The location anchor of claim 6, wherein the plurality of directional transmitters is configured to transmit the first signals at each of the plurality of identifiable angles in a time sequence.

8. The location anchor of claim 1, wherein the transceiver is configured to transmit a third signal that includes the angular orientation of the object with respect to the location anchor.

9. A system comprising:
a location anchor, wherein the location anchor comprises:
a transceiver;
a programmable processor;
executable control software stored on a non-transitory computer readable medium; and
a plurality of directional receivers of electromagnetic radiation,
wherein the plurality of directional receivers are positioned about a perimeter of the location anchor,
wherein the plurality of directional receivers are configured to receive first signals from an object at a plurality of identifiable angles, and
wherein, based on the first signals, a location engine is configured to determine an angular orientation of the object with respect to the location anchor;
wherein the location engine is in signal communication with the location anchor;
wherein the transceiver is configured to transmit, to the location engine, information related to the angular orientation of the object with resect to the location anchor, and wherein, based on the information, the location engines is configured to determine the angular orientation of the object with respect to the location anchor.

10. The location anchor of claim 9, wherein the location engine is configured to use the determined angular orientation of the object with respect to the location anchor to determine a location of the object.

11. The location anchor of claim 9, wherein the transceiver is configured to transmit a third signal that includes the angular orientation of the object with respect to the location anchor.

12. A system comprising:
a location engine; and
a plurality of location anchors, wherein at least one of the plurality of location anchors comprises a plurality of directional transmitters, wherein the plurality of directional transmitters are configured to transmit a plurality of first signals to an object at a plurality of identifiable angles, and wherein each directional transmitter of the plurality of directional transmitters is configured to include information unique to the respective identifiable angle in a corresponding first signal of the plurality of first signals transmitted from the plurality of directional transmitters,
wherein the location engine is configured to determine an angular orientation of the object with respect to the at least one location anchor based on the plurality of first signals, and
wherein, based on the angular orientation of the object with respect to the at least one location anchor, the location engine is further configured to estimate a location of the object;
wherein the object is configured to transmit information related to the angular orientation of the objet with respect to the at least one of the location anchors to the location engine.

13. The system of claim 12, wherein the plurality of directional transmitters comprises a laser diode.

14. The system of claim 12, wherein the plurality of directional transmitters comprises an LED.

15. The system of claim 12, wherein, based on the information, the location engine is configured to determine the estimated location of the object.

16. The system of claim 12, wherein the information unique to the respective identifiable angle comprises an identifier of the at least one location anchor and a sub-identifier indicative of an angular direction of the respective identifiable angle.

17. The system of claim 1, wherein the location anchor further comprises a pressure sensor.

18. The system of claim 9, wherein the location anchor further comprises a pressure sensor.

19. The system of claim 12, wherein at least one location anchor comprises a pressure sensor.

20. The system of claim 19, wherein at least one location anchor is configured to transmit pressure measured by the pressure sensor.

* * * * *

UNITED STATES PATENT AND TRADEMARK OFFICE
CERTIFICATE OF CORRECTION

PATENT NO. : 10,001,545 B2
APPLICATION NO. : 15/423321
DATED : June 19, 2018
INVENTOR(S) : Patrick S. Gonia and Soumitri Kolavennu It is certified that error appears in the above-identified patent and that said Letters Patent is hereby corrected as shown below:

In the Claims

Column 9/Line 62: Claim 9 "resect" should be "respect"

Signed and Sealed this
Twentieth Day of November, 2018

Andrei Iancu
*Director of the United States Patent and Trademark Office*